(12) United States Patent
Xiong et al.

(10) Patent No.: US 12,457,014 B2
(45) Date of Patent: Oct. 28, 2025

(54) SYSTEM AND METHOD FOR DISTINGUISHING BETWEEN ACTIVE AND PASSIVE NFC DEVICES BASED ON ADJUSTMENT OF CARRIER FREQUENCY

(71) Applicant: STMICROELECTRONICS (CHINA) INVESTMENT CO., LTD., Shanghai (CN)

(72) Inventors: Tianhao Xiong, Shanghai (CN); Gang Wu, Shanghai (CN)

(73) Assignee: STMICROELECTRONICS (CHINA) INVESTMENT CO., LTD., Shanghai (CN)

( * ) Notice: Subject to any disclaimer, the term of this patent is extended or adjusted under 35 U.S.C. 154(b) by 323 days.

(21) Appl. No.: 18/257,268

(22) PCT Filed: Dec. 22, 2020

(86) PCT No.: PCT/CN2020/138274
§ 371 (c)(1),
(2) Date: Jun. 13, 2023

(87) PCT Pub. No.: WO2022/133717
PCT Pub. Date: Jun. 30, 2022

(65) Prior Publication Data
US 2024/0048183 A1     Feb. 8, 2024

(51) Int. Cl.
*H04B 5/79* (2024.01)
*H04B 5/26* (2024.01)
(Continued)

(52) U.S. Cl.
CPC .......... *H04B 5/79* (2024.01); *H04B 5/26* (2024.01); *H04B 5/45* (2024.01); *H04B 5/77* (2024.01)

(58) Field of Classification Search
CPC ... H04B 5/79; H04B 5/45; H04B 5/77; H04B 5/26
See application file for complete search history.

(56) References Cited

U.S. PATENT DOCUMENTS

| 9,870,660 B1 | 1/2018 | Patterson |
| 10,192,373 B1 | 1/2019 | Patterson |
| (Continued) | | |

FOREIGN PATENT DOCUMENTS

| CN | 101517594 A | 8/2009 |
| CN | 104242377 A | 12/2014 |
| (Continued) | | |

OTHER PUBLICATIONS

Chen Zhen, "The Design of NFC Tag's Channel Code and Decode Unit and Information Safety Unit," China Master's Theses Full-text Database, May 1, 2014 (56 pgs.); plus annexed Written Opinion dated Aug. 26, 2020, for Intl. Appl. No. PCT/CN2019/121170 provided for relevance (4 pgs.).

(Continued)

*Primary Examiner* — David Bilodeau
(74) *Attorney, Agent, or Firm* — Seed Intellectual Property Law Group LLP

(57) ABSTRACT

A near field communication (NFC) reader detects whether NFC devices are passive NFC devices or active NFC devices. The NFC reader outputs an interrogation signal and a carrier signal. When the NFC reader receives a response signal from an NFC device responsive to the interrogation signal, the NFC reader adjusts the frequency of the carrier signal before the end of the response signal. The NFC reader determines whether the NFC device is a passive NFC device or an active NFC device based on characteristics of the remaining portion of the response signal.

20 Claims, 10 Drawing Sheets

(51) Int. Cl.
*H04B 5/45* (2024.01)
*H04B 5/77* (2024.01)

(56) References Cited

U.S. PATENT DOCUMENTS

| | | | |
|---|---|---|---|
| 2008/0024276 A1* | 1/2008 | Volpi | H04B 5/77 |
| | | | 340/10.1 |
| 2008/0024277 A1* | 1/2008 | Volpi | G01S 13/878 |
| | | | 340/10.1 |
| 2008/0079540 A1* | 4/2008 | Aull | H04B 5/48 |
| | | | 340/5.8 |
| 2010/0164690 A1* | 7/2010 | Raphaeli | H04W 74/00 |
| | | | 340/10.2 |
| 2010/0308964 A1* | 12/2010 | Ackley | H04B 5/79 |
| | | | 340/10.1 |
| 2011/0165862 A1 | 7/2011 | Yu et al. | |
| 2012/0280650 A1 | 11/2012 | Kim et al. | |
| 2013/0062959 A1 | 3/2013 | Lee et al. | |
| 2014/0353390 A1 | 12/2014 | Narendra et al. | |
| 2015/0177330 A1 | 6/2015 | Morris | |
| 2017/0098149 A1 | 4/2017 | Kesler et al. | |
| 2017/0289742 A1 | 10/2017 | Asakura | |
| 2017/0331317 A1 | 11/2017 | Wheeland et al. | |
| 2017/0373726 A1* | 12/2017 | Nakano | H04L 1/08 |
| 2019/0036568 A1 | 1/2019 | Kovacic et al. | |
| 2020/0151403 A1 | 5/2020 | Forster | |
| 2021/0044978 A1* | 2/2021 | Michaelis | H04W 12/08 |
| 2021/0374365 A1* | 12/2021 | Patricio | H04B 5/266 |
| 2023/0021561 A1* | 1/2023 | Xiong | H04B 5/266 |

FOREIGN PATENT DOCUMENTS

| | | |
|---|---|---|
| CN | 106059629 A | 10/2016 |
| CN | 107210786 A | 9/2017 |
| CN | 107925443 A | 4/2018 |
| CN | 108695998 A | 10/2018 |
| EP | 2701314 A1 | 2/2014 |
| EP | 3376679 A1 | 9/2018 |
| WO | WO 2018005135 A1 | 1/2018 |
| WO | WO 2020217909 A1 | 10/2020 |

OTHER PUBLICATIONS

U.S. Appl. No. 17/779,517, filed May 24, 2022.

* cited by examiner

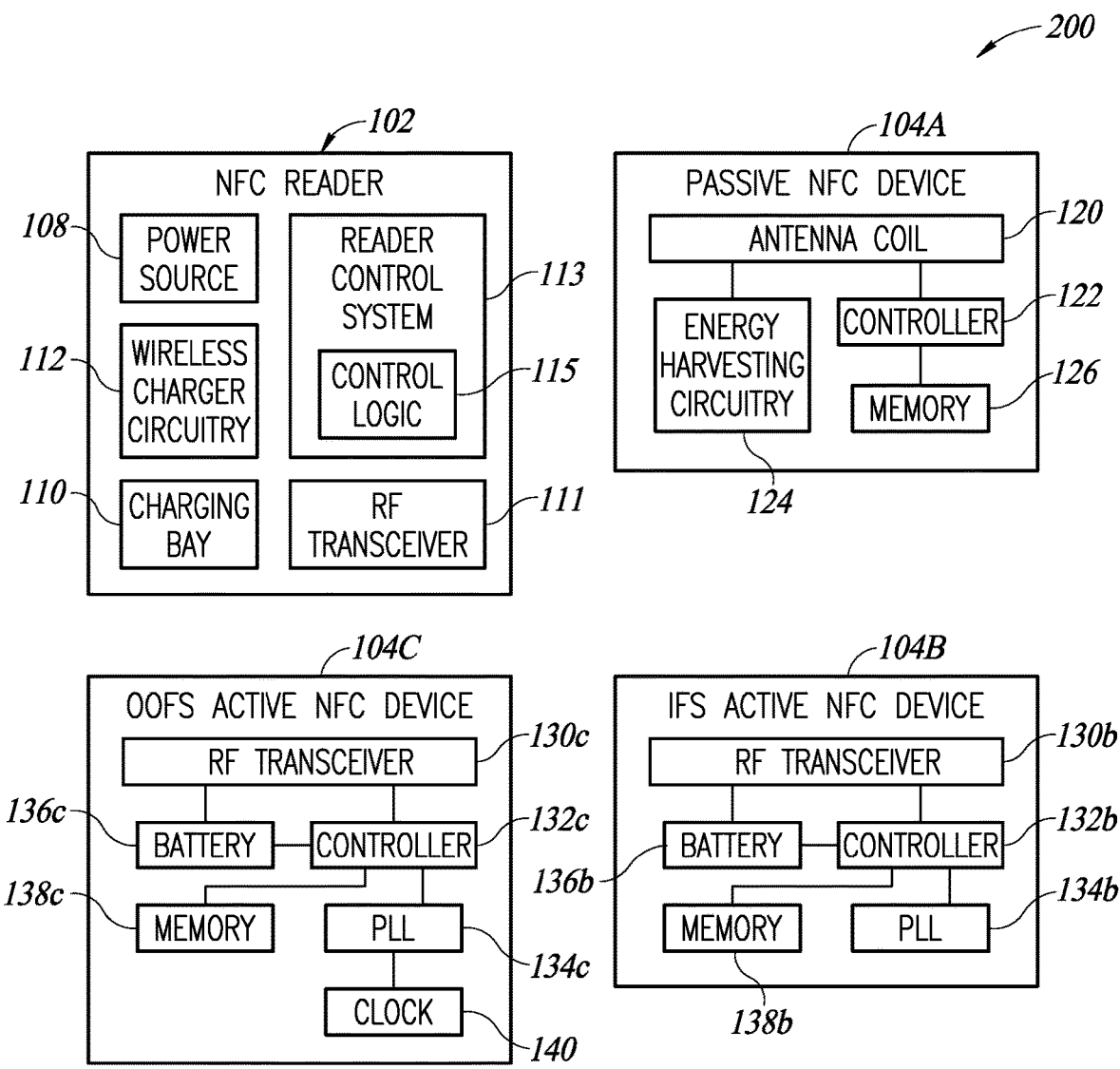
FIG. 2

SYSTEM AND METHOD FOR DISTINGUISHING BETWEEN ACTIVE AND PASSIVE NFC DEVICES BASED ON ADJUSTMENT OF CARRIER FREQUENCY

BACKGROUND

Technical Field

The present disclosure relates to the field of near field communication (NFC). The present disclosure relates more particularly to identification of NFC devices by an NFC reader.

Description of the Related Art

NFC technology utilizes radiofrequency signals to enable devices to communicate with each other in close proximity. Many applications of NFC technology utilize an NFC reader to interrogate and receive data from an NFC device. The NFC reader typically outputs an interrogation signal. If an NFC device is within range of the interrogation signal, then the NFC device responds by providing an identification signal identifying the NFC device. After the NFC device has identified itself, the NFC reader and the NFC device can further exchange information.

NFC devices can be categorized as either passive NFC devices or active NFC devices. In general, passive NFC devices are powered by energy harvested from the carrier signal of an NFC reader. Active NFC devices differ from passive NFC devices in that they include their own power sources. Furthermore, there are different types of active NFC devices.

BRIEF SUMMARY

Embodiments of the present disclosure provide NFC readers that are able to distinguish between passive NFC devices and active NFC devices. An NFC reader transmits a carrier signal at a standard NFC frequency. When the NFC reader receives the beginning of a response from an NFC device, the NFC reader adjusts the frequency of the carrier signal to a non-standard frequency. The NFC reader then receives the remainder of the response while transmitting the carrier signal at the non-standard frequency. The NFC reader can distinguish between a passive NFC device and an active NFC device based on the characteristics of the remaining portion of the response signal.

In one embodiment, an NFC reader can further distinguish between different types of active NFC devices. The NFC reader can adjust the frequency of the carrier signal to a first non-standard frequency while receiving an initial portion of a response from the NFC device to determine if the NFC devices is an active NFC device or a passive NFC device. If the NFC device is an active NFC device, the NFC reader again initiates communication on the standard frequency and then switches the carrier signal to a second non-standard frequency after receiving the beginning of a response. The NFC reader determines what type of active NFC device is present based on the remainder of the response while transmitting the carrier signal at the second non-standard frequency.

In one embodiment, the NFC reader initiates communication with an NFC device while transmitting the carrier signal at a non-standard frequency. The NFC reader analyzes the frequency of the response signal in order to determine whether an NFC device is a passive NFC device or a first or second type of active NFC device.

In one embodiment, the NFC reader initiates communication with an NFC device while transmitting the carrier signal at a standard frequency. After receiving an initial portion of the response the NFC reader switches the carrier frequency to a non-standard frequency. The NFC reader determines whether the NFC device is a passive NFC device or a first or second type of active NFC device based on the frequency of the response signal.

BRIEF DESCRIPTION OF THE SEVERAL VIEWS OF THE DRAWINGS

FIG. 1 is a block diagram of an NFC system, according to one embodiment.

FIG. 2 is a block diagram of an NFC system, according to one embodiment.

DETAILED DESCRIPTION

Figure 3A:
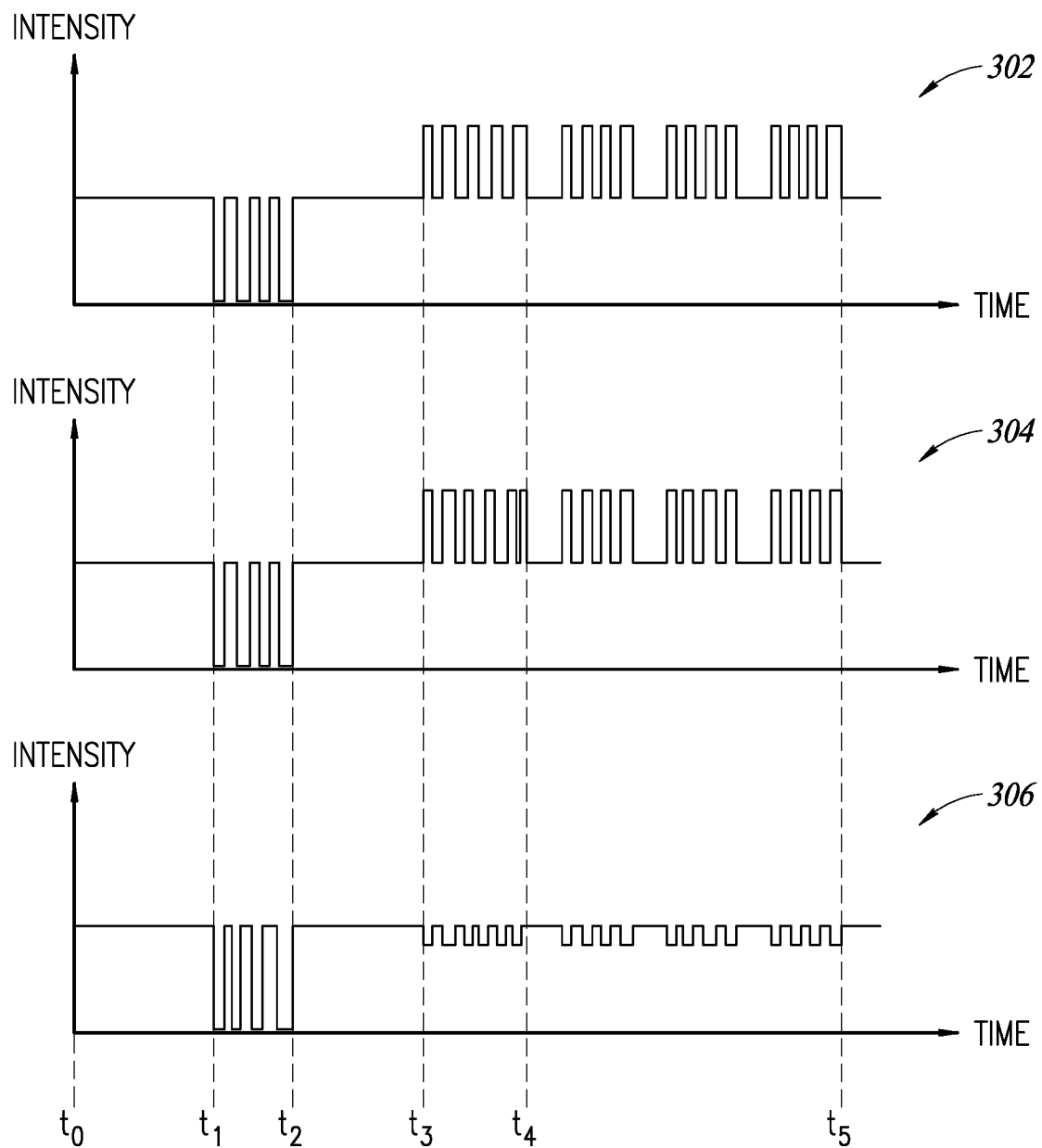
FIGS. 3A-3C are timing diagrams of NFC signals, according to one embodiment.

FIG. 1 is a block diagram of a near field communication (NFC) system 100, according to one embodiment. The NFC system 100 includes an NFC reader 102 and an NFC device 104. The NFC reader 102 and the NFC device 104 communicate with each other utilizing NFC technology.

The NFC reader 102 outputs a carrier signal. The carrier signal is a radiofrequency signal that facilitates NFC communication . . . The NFC reader 102 outputs an interrogation signal by modulating the carrier signal. The interrogation signal is configured to induce a response from NFC devices that are in communication range with the NFC reader 102. If the NFC device 104 is within range of the NFC reader 102, then the NFC device 104 can respond to the interrogation signal.

In one embodiment, the NFC reader 102 outputs an interrogation signal in accordance with one or more NFC protocols. The NFC protocols define the structure of an interrogation signal. The protocols can define the frequency of the interrogation signal, the type of data included in the interrogation signal, the amount of data included in the interrogation signal, and the duration of the interrogation signal. Some common NFC protocols define a standard frequency of 13.56 MHz for the carrier signal, though other standard frequencies are possible depending on NFC protocols or future updates to NFC protocols.

If the NFC device 104 operates with the same protocol as the interrogation signal, then the NFC device 104 will respond to the interrogation signal. The protocols also define the structure of the initial response of the NFC device 104 to the interrogation signal from the NFC reader 102.

In one embodiment, the NFC device 104 is a passive load modulation NFC device 104. Passive load modulation NFC devices do not have their own power sources. Instead, passive load modulation NFC devices are powered by the carrier signal output from the NFC reader 102. Accordingly, passive load modulation NFC devices include energy harvesting circuitry that harvests energy from the carrier signal output by the NFC reader 102. As used herein, the term "passive NFC device" may be used interchangeably with the term "passive load modulation NFC device".

Passive load modulation includes modifying the impedance of an antenna coil of the passive NFC device at the rate of a data carrying load modulation signal. This impedance modulation is echoed by inductive coupling in the impedance of an antenna coil of the NFC reader 102. The NFC reader 102 can extract from its antenna signal the load modulation signal used by the passive NFC device. In this way, the NFC reader 102 can extract an identification or other data from the passive NFC device. Passive load modulation NFC devices as described herein can operate in accordance with well understood passive load modulation techniques. Because passive NFC devices are powered by energy harvested from the carrier signal, passive NFC devices modulate the impedance in accordance with the frequency of the carrier signal.

In one embodiment, the NFC device 104 is an active load modulation NFC device. Active load modulation NFC devices are powered by a power source separate from the NFC reader 102. Accordingly, when an active load modulation NFC device receives an interrogation signal, the active load modulation NFC device responds by outputting a radiofrequency signal and modulating the radiofrequency signal under the power of a power source separate from the NFC reader 102. Data is transmitted from the NFC device 104 by modulating the radiofrequency signal output by the NFC device 104. As used herein, the term "active NFC device" may be used interchangeably with the term "active load modulation NFC device". Active load modulation can be achieved in other ways without departing from the scope of the present disclosure.

Active and passive load modulation NFC devices typically operate in accordance with particular protocols. In particular, passive load modulation NFC devices typically operate in accordance with a different subset of NFC protocols than do active load modulation NFC devices. In most cases, the NFC reader 102 can accurately determine whether the NFC device 104 is an active NFC device or a passive NFC device based on the protocols with which the NFC device 104 responds to the NFC reader 102.

Some NFC protocols stipulate that the phase of the response signal output by an active NFC device should be within a selected phase difference from the carrier signal. For example, NFC protocols may stipulate that the phase difference between the carrier signal and the response signal should be less than 30°. Accordingly, active NFC devices typically attempt to lock the phase of the response signal to the phase of the carrier signal. If the carrier signal is 13.56 MHz, then the active NFC devices typically transmit response signals at 13.56 MHz. The active NFC devices also lock the phase of the response signal with the phase of the carrier signal.

There are two general ways in which active NFC devices synchronize the phase of the response signal with the phase of the carrier signal. The first type of phase synchronization is in-frame synchronization (IFS). The second type of phase synchronization is out-of-frame synchronization (OOFS). The frame of an NFC communication begins with the transmission of the interrogation signal from the NFC reader 102. The frame continues through the reception of the response signal from the NFC device 104. Accordingly, the NFC communication frame extends from the beginning of the interrogation signal to the end of the response signal. As used herein, IFS based active NFC devices may be referred to as IFS active NFC devices or as type 1 active NFC devices. As used herein, OOFS based active NFC devices may be referred to as OOFS active NFC devices or as type 2 active NFC devices.

There are cases in which the NFC device 104 may operate in accordance with a protocol that does not correspond to its true nature. In some cases, the NFC device 104 may be a passive NFC device that operates in accordance with a protocol typically reserved for active NFC devices. In other cases, the NFC device 104 may be an active NFC device that operates in accordance with a protocol typically reserved for passive NFC devices. If an NFC reader does not correctly identify the type of an NFC device, it is possible that the NFC device can be damaged.

As an example, many mobile phones act as NFC devices. The mobile phones are active NFC devices. In many cases, users physically attach credit cards or ID cards their mobile phones. These credit cards and ID cards are typically passive NFC devices. The mobile phone may also include software applications that enable a credit card to be "cloned" to an NFC application of the mobile phone. Cloning the credit card corresponds to storing information related to the credit card, such as the credit card number, the expiration date, and the billing ZIP Code with the NFC application. When the mobile phone is placed within range of an NFC reader, the mobile phone communicates with the NFC reader as though the mobile phone is the credit card. Based on such an interaction, the traditional NFC reader may assume that only a passive NFC device (credit card) is present. In other cases, because credit cards or ID cards are physically coupled to a mobile phone, a traditional NFC reader may communicate with the mobile phone and may not identify the additional presence of one or more passive NFC devices.

In one embodiment, the NFC reader 102, or an electronic device that incorporates the NFC reader 102, includes wireless charging circuitry that is separate from the NFC communication circuitry. The wireless charging circuitry has the ability to charge the battery of the NFC device 104 if the NFC device 104 is an active NFC device. In particular, the wireless charging circuitry is able to output a charging field. The active NFC device can harvest energy from the charging field. In this manner, the wireless charging circuitry can charge a battery of an active NFC device.

When describing embodiments in which separate wireless charging circuitry is used to charge a battery of an active NFC device, the NFC reader 102 may be described as including the wireless charging circuitry. The wireless charging circuitry includes an antenna coil that is separate from an NFC communication antenna of the NFC reader 102 and does not operate in accordance with NFC communication frequencies and protocols. Thus, the NFC reader 102 may be a device that includes both NFC communication circuitry and separate wireless charging circuitry.

In one embodiment, the wireless charging circuitry operates in accordance with a Qi wireless charging standard. The Qi wireless charging circuitry outputs a charging field in a range between 87 kHz and 205 kHz. NFC signals typically communicate at a frequency of 13.56 MHz. Accordingly, the Qi charging field is outside a frequency range of NFC communication signals.

Passive NFC devices can be damaged by the charging field output by the wireless charging circuitry. If an NFC reader misidentifies a passive NFC device as an active NFC device, then it is possible that the NFC reader could cause the wireless charging circuitry to output a charging field that could damage the passive NFC device.

The NFC reader 102 is able to reliably identify whether the NFC device 104 is an active NFC device or a passive NFC device. The NFC reader 102 is further able to identify whether an active NFC device is an IFS active NFC device or an OOFS active NFC device. As set forth above, in some instances it is possible that a passive NFC device could utilize a protocol typically associated with active NFC devices, or vice versa. Accordingly, after the NFC reader 102 has initially established communication with the NFC device 104, the NFC reader 102 performs a further test to determine whether the NFC device 104 is an active NFC device or a passive NFC device. Thus, the NFC reader 102 does not determine whether the NFC device 104 is an active or passive based solely on the NFC protocol with which the NFC device 104 operates.

When the NFC reader 102 outputs an interrogation signal, the NFC reader 102 also outputs a carrier signal. The NFC device 104 responds by providing an identification signal or another type of response signal. The identification signal is defined by a frame during which the NFC device 104 transmits a radiofrequency signal and modulates the radiofrequency signal. The modulation of the radiofrequency signal corresponds to the data provided by the NFC device 104. The beginning of the modulated radiofrequency signal from the NFC device 104 corresponds to the start of the frame. The conclusion of the modulated frequency signal from the NFC device 104 correspond to the end of the frame. As set forth in more detail below, the NFC reader 102 utilizes the structure of the response to reliably determine if the NFC device 104 is a passive NFC device or an active NFC device. The NFC reader can also determine whether an active NFC device 104 is an IFS active NFC device or an OOFS active NFC device.

In one embodiment, the NFC reader 102 transmits a carrier signal at a first, standard frequency. The NFC reader transmits an interrogation signal by modulating the carrier signal. After transmitting the interrogation signal, the NFC reader 102 continues transmitting the carrier signal. When the NFC reader 102 receives the start of frame of the response or identification signal from the NFC device 104, the NFC reader 102 adjusts the frequency of the carrier signal to a non-standard frequency. This adjustment of the frequency of the carrier signal during the frame can be utilized to determine whether the NFC device 104 is an active NFC device or a passive NFC device.

The NFC reader 102 listens for the remainder of the response while outputting the carrier signal at the non-standard frequency. In one embodiment, the value of the non-standard frequency is selected so that a passive NFC device can complete the response signal without error, whereas an active NFC device will not be able to provide the remainder of the response signal without error. If there is an error in the remainder of the response, the NFC reader 102 determines that the NFC device 104 is an active NFC device. If there is no error in the remainder of the response, then the NFC reader 102 determines that the NFC device 104 is a passive NFC device.

In one embodiment, the value of the non-standard frequency is selected so that an IFS active NFC device can transmit the remainder of the response without error, whereas an OOFS active NFC device cannot transmit the remainder of the response without error. Due to the different phase synchronization processes utilized by IFS and OOFS active NFC devices, IFS active NFC devices can transmit error-free responses for wider range of non-standard carrier frequencies than can OOFS active NFC devices. The reasons for this are described in more detail with regards to FIGS. 2-3C. Accordingly, if the frequency of the carrier signal is adjusted incrementally from the standard carrier signal, the OOFS active NFC devices will lose the ability to provide an error-free response signal before the IFS active NFC devices lose the ability to provide an error-free response signal. Accordingly, when determining whether the NFC device 104 is an IFS active NFC device or an OOFS active NFC device, the NFC reader selects a non-standard carrier signal frequency that diverges farther from the standard frequency than the OOFS can handle, but not so far that the IFS active NFC device cannot reliably handle the response.

The NFC reader 102 can utilize various processes for determining whether the NFC device is a passive NFC device, an IFS active NFC device, or an OOFS active NFC device. In one example, at the beginning of a first frame, the NFC reader 102 transmits the carrier signal with a standard frequency. After receiving the beginning of the response from the NFC device 104, the NFC reader 102 adjusts the frequency of the carrier signal to a first non-standard frequency at which passive NFC devices can still reliably respond but active in the two devices cannot reliably respond. If the remainder of the response is error-free, or otherwise has standard characteristics, then the NFC device 104 is a passive NFC device. If the remainder of the response includes errors or otherwise cannot be completed, then the NFC device 104 is an active that she device. If the NFC device 104 is an active NFC device, then the NFC reader 102 initiates a second frame by transmitting the carrier signal at the standard frequency. After receiving the beginning of the response from the NFC device 104, the NFC reader 102 adjusts the frequency of the carrier signal to a second non-standard frequency at which IFS active NFC devices can reliably respond but OOFS active NFC devices cannot reliably respond. If the remainder of the response in the second frame is error-free, then the NFC device 104 is an IFS active NFC device. If the remainder of the response of the second frame has errors, then the NFC device 104 is an OOFS active NFC device. In this example, the first frequency is farther from the standard frequency than is the second frequency. In alternative examples, the NFC reader 102 can switch in the first frame to a non-standard frequency that is selected to distinguish between OOFS active NFC devices and IFS or passive devices. The NFC reader can then switch in the second frame to a non-standard frequency that is selected to distinguish between IFS active NFC devices and passive devices. Accordingly, by analyzing the response at two different non-standard frequencies in separate frames in any order, the NFC reader 102 can determine whether the NFC device 104 is a passive NFC device, an IFS active NFC device, or an OOFS active NFC device.

The NFC reader 102 can distinguish between an OOFS active NFC device or an IFS active NFC device or passive NFC device by analyzing the frequency characteristics of the response signal. In one embodiment, the NFC reader 102 initially transmits the carrier signal on the standard frequency as described above. After receiving an initial portion of the response, the NFC reader 102 adjusts the frequency of the carrier signal to a non-standard frequency. The NFC reader 102 listens for the remaining portion of the response and analyzes the frequency characteristics of the remaining portion of the response. The primary frequency of the remaining portion of the response signal of an OOFS active NFC device will be at the standard frequency. An IFS active NFC device or a passive NFC device will have frequency responses that are aligned with the non-standard frequency.

In one embodiment, the NFC reader 102 initially transmits the carrier signal on a non-standard frequency. The NFC reader 102 analyzes the frequency characteristics of the response. The primary frequency of the response signal of an OOFS active NFC device will be at the standard frequency. An IFS active NFC device or a passive NFC device will have frequency responses that are aligned with the non-standard frequency.

The NFC reader 102 is able to selectively cause the wireless charging circuitry to output the charging signal based on whether or not the NFC device 104 is an active NFC device or a passive NFC device. If the NFC reader 102 determines that the NFC device 104 is an active NFC device, then the NFC reader 102 may cause the wireless charging circuitry to output the charging field to charge the battery of the NFC device 104. If the NFC reader 102 determines that the NFC device 104 is a passive NFC device, then the NFC reader 102 does not cause the wireless charging circuitry to output the charging field. In this way, the NFC reader 102 will prevent the wireless charging circuitry from damaging the passive NFC device by outputting a charging field that the passive NFC device cannot safely endure.

FIG. 2 is a block diagram of an NFC communication system 200, according to one embodiment. The NFC communication system 100 includes an NFC reader 102, a passive NFC device 104A, an OOFS active NFC device 104B, and an IFS active NFC device 104C. The NFC reader 102 communicates via NFC communication protocols with the passive NFC device 104A, the IFS active NFC device 104B, and the OOFS active NFC device 104C.

The NFC reader 102 includes an RF transceiver 111, a reader control system 113, a power source 108, a charging bay 110, and wireless charging circuitry 112. The reader control system 113 includes control logic 115. The components of the NFC reader 102 to cooperate together to provide NFC communication and separate wireless charging.

The RF transceiver 111 enables the NFC reader 102 to transmit signals and to receive signals. The RF transceiver 111 can include one or more antennas for transmitting NFC signals and for receiving NFC signals. The RF transceiver 111 can include additional circuitry for enabling the RF transceiver 111 to transmit signals including interrogation signals, carrier signals, and other types of signals. The RF transceiver 111 can include additional circuitry for enabling the RF transceiver 111 to receive and process signals including interrogation signals and other types of signals from the passive NFC device 104A, the IFS active NFC device 104B, and the OOFS active NFC device 104C.

The reader control system 113 includes control circuitry for controlling the function of the NFC reader 102. The reader control system 113 controls the operation of the RF transceiver 111. The reader control system 113 controls the transmission of signals with the RF transceiver 111. The reader control system 113 also controls the reception of signals with the RF transceiver 111. The reader control system 113 can include processing resources, memory resources, and data transmission resources.

The control system 113 includes the control logic 115. The control logic 115 can include instructions for operation of the control system 113. The control logic 115 can include instructions protocols for performing the operations, processes, and methods executed by the NFC reader 102, including those described herein. The control logic 115 can correspond to software instructions stored in a memory of the NFC reader 102.

The power source 108 provides power to the NFC reader 102. The power source 108 can include one or more of an internal battery, a wired power connection to an external power source, and a wireless power connection to an external power source.

The wireless charging circuitry 112 selectively provides a wireless charging field based on whether the types of NFC devices that are present as determined by the NFC reader 102. The wireless charging circuitry 112 includes an antenna that is separate from an NFC communication antenna of the NFC reader 102 and does not operate in accordance with NFC communication frequencies and protocols. Thus, the NFC reader 102 may be a device that includes both NFC communication circuitry and separate wireless charging circuitry.

In one embodiment, the wireless charging circuitry 112 operates in accordance with a Qi wireless charging standard. The Qi wireless charging circuitry outputs a charging field in a range between 87 kHz and 205 kHz. NFC signals typically communicate at a frequency of 13.56 MHz. Accordingly, the Qi charging field is outside a range of NFC communication signals. The wireless charging circuitry 112 may also operate in accordance with charging protocols or standards other than Qi without departing from the scope of the present disclosure.

The wireless charging circuitry 112 of the NFC reader 102 can be controlled by its own control logic, by the control logic 115 of the reader control system 113, or by other control systems. The wireless charging circuitry selectively outputs the wireless charging field based on the types of NFC devices present as detected by the reader control system 113.

The charging bay 110 includes a physical area on which an OOFS active NFC device 104C can be positioned in order to receive wireless charging signals from the NFC reader 102. When an OOFS active NFC device 104C is positioned on the charging bay 110, the NFC reader 102 detects that the NFC device 104A is an active NFC device and causes the charging field circuitry 112 to begin outputting the wireless charging field.

In one embodiment, positioning either or both of the passive NFC device 104A and the passive NFC device 104A on the charging bay 110 causes the NFC reader 102 to establish communication with and determine the types of the NFC devices as described herein. The wireless charging circuitry 112 can then output the full charging field, output the reduced charging field, or refrain from outputting the charging field.

The passive NFC device 104A includes an antenna coil 120, control logic 122, energy harvesting circuitry 124, and memory 126. The antenna coil includes one antennas and other circuitry for receiving signals from the NFC reader 102 and for providing signals to the NFC reader 102.

The control logic 122 controls the operation of the antenna coil 120. The control logic 122 controls the modulation of output of signals from the antenna coil 120 responsive to interrogation signals received from the NFC reader 102. The control logic 122 controls modulation of an impedance of the antenna coil 120. The memory 126 stores identification data related to the passive NFC device 104A.

When the antenna coil 120 receives signals from the NFC reader 102, the energy harvesting circuitry 124 harvests energy from the signals. The energy harvesting circuitry 124 powers the control logic with energy harvested from the signals. When the antenna coil 120 receives an interrogation signal from the NFC reader 102, the control logic retrieves identification data from the memory 126 and causes the antenna coil to provide the identification signal including the identification data by modulating the impedance of the antenna coil 120 in accordance with well understood techniques.

Because the antenna coil 120 is driven by the carrier signal from the NFC reader 102, the passive NFC device 104A can transmit response signals that can be received without error by the NFC reader 102 at frequencies that differ greatly from the standard frequency. As will be set forth in more detail below, this enables the passive NFC device 104A to transmit response signals that can be received without error by the NFC reader 102 or greater frequency differences then can the IFS active NFC device 104B and the OOFS active NFC device 104C.

The IFS active NFC device 104B includes an RF transceiver 130b, a controller 132b, a memory 138b, and a battery 136b. The RF transceiver 130b includes one or more antennas and other RF circuitry for receiving signals from the NFC reader 102 and for outputting signals to the NFC reader 102.

The controller 132b controls the operation of the RF transceiver 130b. The controller 132b can include processing resources for signal processing, for controlling the RF transceiver 130b, and for reading data from and for writing data to the memory 138b.

The memory 138b can store software instructions for the operation of the active NFC device 104. The memory 138b can store data including the identification and other parameters associated with the IFS active NFC device 104B.

The battery 136b provides power to the components of the IFS active NFC device 104B. Because the IFS active NFC device 104B includes the battery 136b, the IFS active NFC device 104B does not need to harvest energy from the carrier signal transmitted by the NFC reader 102 in order to transmit signals to the NFC reader 102.

The IFS active NFC device 104B also includes a phase locked loop (PLL) 134b. The PLL 134b participates in the phase synchronization of the IFS active NFC device 104B. As described previously, the IFS active NFC device 104B synchronizes the phase of the response signal with the phase of the carrier signal of the NFC reader 102 in frame and/or out of frame. The IFS active NFC device 104B can synchronize or lock-in the phase at the beginning of the frame when the NFC reader 102 first transmits the interrogation signal. The RF transceiver 130b receives the interrogation signal the carrier signal and the PLL 134b synchronizes the phase of the response signal with the phase of the carrier signal. The IFS active NFC device has no internal clock. The carrier signal is the source of the clock signal for the IFS active NFC device 104B. As will be set forth in more detail below, the lack of an onboard clock in the IFS active NFC device 104B results in the IFS active NFC device 104B being able to transmit response signals that can be received without error at greater frequency differences from the standard frequency than can the OOFS active NFC device 104C. Nevertheless, the presence of a PLL 134b that is designed with an expectation of receiving the standard frequency is not able to transmit response signals that can be received without error at as high of frequency differences from the standard frequency as can the passive NFC device 104A.

The OOFS active NFC device 104C includes an RF transceiver 130c, a controller 132c, a memory 138c, and a battery 136c. The RF transceiver 130c includes one or more antennas and other RF circuitry for receiving signals from the NFC reader 102 and for outputting signals to the NFC reader 102.

The controller 132c controls the operation of the RF transceiver 130c. The controller 132c can include processing resources for signal processing, for controlling the RF transceiver 130c, and for reading data from and for writing data to the memory 138c.

The memory 138c can store software instructions for the operation of the active NFC device 104. The memory 138c can store data including the identification and other parameters associated with the OOFS active NFC device 104C.

The battery 136c provides power to the components of the OOFS active NFC device 104C. Because the OOFS active NFC device 104C includes the battery 136c, the active NFC device 1028 does not need to harvest energy from the carrier signal transmitted by the NFC reader 102 in order to transmit signals to the NFC reader 102.

The OOFS active NFC device 104C also includes a PLL 134c and a clock 140. The PLL 134c and the clock 140 participate in the phase synchronization of the OOFS active NFC device 104C with the NFC reader 102. The OOFS active NFC device 104C generates a clock signal with the clock 140. The clock 140 generates the clock signal with a standard NFC clock frequency. In one example, the standard NFC clock frequency is 13.56 MHz. The clock 140 generates the clock signal with this frequency because the standard frequency is the expected frequency of the carrier signal. The OOFS active NFC device 104C utilizes the PLL 134c to synchronize the phase of the clock signal utilized by the RF transceiver 130c with the phase of the carrier signal provided by the RF transceiver 111 of the NFC reader 102.

As described previously, the OOFS active NFC device 104C synchronizes the phase of the response signal with the phase of the carrier signal of the NFC reader 102 out of frame. The OOFS active NFC device 104C can synchronize or lock-in the phase before the first frame and between frames. This is possible because the NFC reader 102 transmits the unmodulated carrier signal for a brief period of time prior to initiating the frame by transiting interrogation signal. During this brief period of time before receiving the beginning of the interrogation signal, the OOFS active NFC device 104C synchronizes the phase of the clock signal provided by the clock 140 with the phase of the carrier signal received from the NFC reader 102.

Because the OOFS active NFC device utilizes an onboard clock 140, the OOFS active NFC device 104C is less able to transmit responses that can be received by the NFC reader 102 when the NFC reader 102 has switched the frequency of the carrier signal to a non-standard frequency. In general, the clock 140 will only generate a clock signal with the standard NFC frequency. Accordingly, when the carrier signal from the NFC reader 102 has a non-standard frequency, the OOFS active NFC device 104B will still transmit a response in accordance with the standard frequency. The result is that the NFC reader 102 will receive a reply from the OOFS active NFC device 104C that is out of phase and unreadable. The NFC reader 102 will determine that the response signal is erroneous. Accordingly, the use of the onboard clock 140 by the OOFS active NFC device 104C is one reason that the response signals from the OOFS active NFC device 104C will be detected as erroneous at lower frequency differences than the IFS active NFC device 104B.

FIG. 3A illustrates timing diagrams for signals transmitted and received by the NFC reader 102, according to one embodiment. In the example of FIG. 3A, the carrier signal is broadcast at the standard frequency for the entirety of the frame. The y-axis corresponds to the intensity of signals at the RF transceiver 111 of the NFC reader 102. The x-axis corresponds to time.

The graph 302 corresponds to communication with an OOFS active NFC device. At time t0, the NFC reader broadcast the carrier signal at the standard frequency. Between times t0 and t1, the OOFS active NFC device establishes phase synchronization with the carrier signal of the NFC reader 102. At time t1, the NFC reader 102 transmits the interrogation signal by modulating the carrier signal. Time t1 corresponds to the beginning of the frame. At time t2, the NFC reader 102 stops transmitting the interrogation signal and resumes transmitting the unmodulated carrier signal until time t3. At time t3, the NFC reader 102 receives the beginning of the response signal from the OOFS active NFC device. The response signal received by the NFC reader 102 from the OOFS active NFC device is represented by higher peak intensity and signal modulation. The NFC reader 102 receives the response signal until time t5. Time t5 corresponds to the end of the frame. The frame corresponds to the time between t1 and t5. In the example of FIG. 3A, the frequency of the carrier signal has not been adjusted. Accordingly, the response signal is received from the OOFS active NFC device without error. The significance of time t4 will be described in relation to FIGS. 3B and 3C.

The graph 304 corresponds to communication with the IFS active NFC device 104B. The graph 304 which substantially identical to the graph 302 because response signals from both the IFS active NFC device 104B and the OOFS active NFC device 104C are received by the NFC reader 102 without error when the carrier signal is maintained at the standard frequency for the entirety of the frame. Though not apparent in FIG. 3A, the IFS active NFC device 104B performs phase synchronization during the frame. In one example, the IFS active NFC device 104B performs phase synchronization while transmitting the response signal between times t3 and t5.

The graph 306 corresponds to communication with the passive NFC device 104A. The graph 306 is substantially similar to the graphs 302 and 304, except that the response signal from the passive NFC device 104A is indicated by modulations that reduce the intensity of signals at the RF transceiver 111 of the NFC reader 102.

In one embodiment, the duration of the interrogation signal is between 60 µs and 80 µs. In one embodiment, the delay between transmission of the interrogation signal and reception of the start of identification signal is between 70 µs and 100 µs. In one embodiment, the expected duration of the identification signal is between 140 µs and 200 µs. In one embodiment, the delay between receiving the start of frame and adjusting the frequency of the carrier signal is between 10 µs and 100 µs. Those of skill in the art will recognize, in light of the present disclosure, that other values for the timing of the various signals can be utilized without departing from the scope of the present disclosure.

Figure 3B:
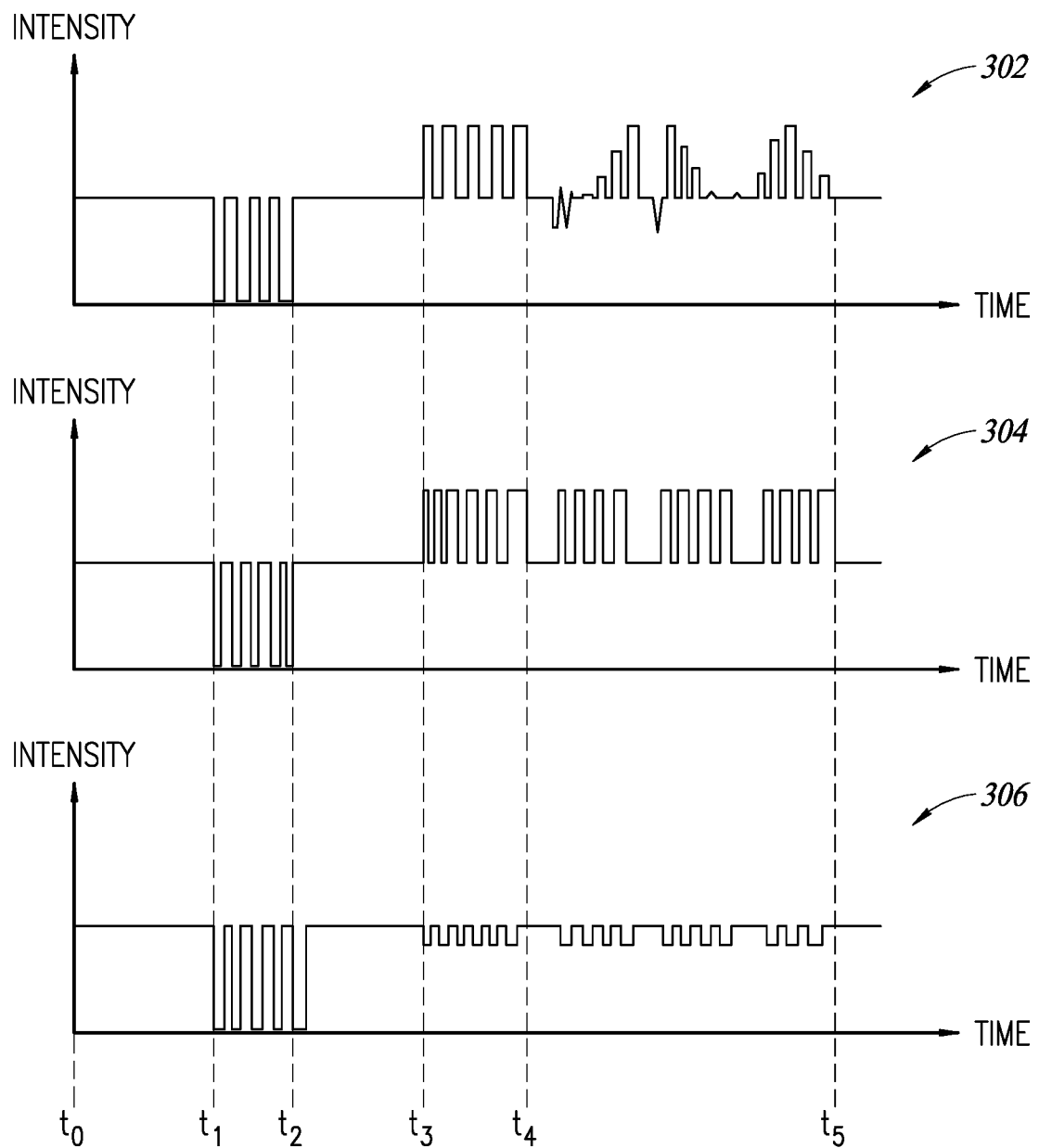

FIG. 3B represents a situation in which the NFC reader 102 adjusts the frequency of the carrier signal after receiving the beginning of the response signal. In FIG. 3B, the NFC reader 102 adjusts the frequency of the carrier signal from the standard frequency to a non-standard frequency at which the response signal from the OOFS active NFC device 104C cannot be reliably received, but that which the response signals from the IFS active NFC device 104B and the passive NFC device 104A can be reliably received without error.

Between times t0 and t4, the operation of the NFC reader 102 is the same as described in relation to FIG. 3A. With reference to graph 302 of FIG. 3B corresponding to communication with the OOFS active NFC device 104C, after the NFC reader 102 has received an initial portion of the response signal from the OOFS active NFC device between times t3 and t4, the NFC reader 102 switches the frequency of the carrier signal to a non-standard frequency. The NFC reader 102 then listens to or receives the remainder of the response signal from the OOFS active NFC device between times t4 and t5. As can be seen in FIG. 3B, the remainder of the response signal between times t4 and t5 is distorted for the OOFS active NFC device 104C. This is because the OOFS active NFC device 104C continues outputting response signal at the standard frequency while the NFC reader 102 is listening at a non-standard frequency. The result is a communication error in which the NFC reader 102 does not properly receive the remainder of the response from the OOFS active NFC device 104C.

With reference to graphs 304 and 306 of FIG. 3B, between times t4 and 15 the remainder of the response of the IFS active NFC device 104B (graph 304) and the passive device 104A (graph 306) are received without error. By the procedure associated with FIG. 3B, the NFC reader 102 can determine whether or not an NFC device is an OOFS active NFC device.

In one example, the non-standard frequency of FIG. 3B is between 100 kHz and 300 kHz away from the standard frequency. The non-standard frequency may be higher or lower than the standard frequency. If the standard frequency is 13.56 MHz, then the non-standard frequency may be between 13.66 MHz and 13.86 MHz, or between 13.26 MHz and 13.46 MHz. The non-standard frequency of FIG. 3B can have other values than these without departing from the scope of the present disclosure.

Figure 3C:
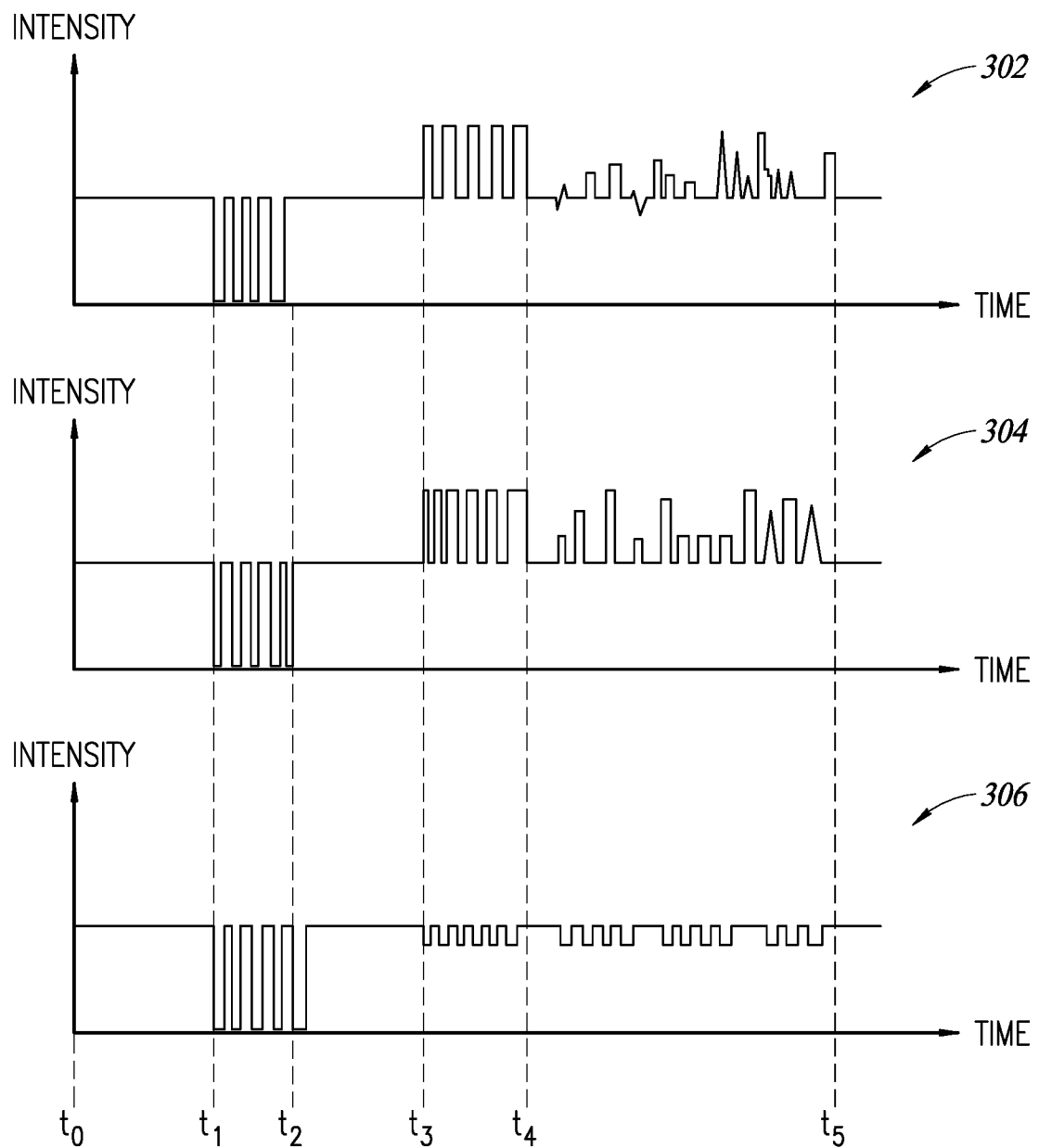

FIG. 3C represents a situation in which the NFC reader 102 adjusts the frequency of the carrier signal after receiving the beginning of the response signal. In FIG. 3C, the NFC reader 102 adjusts the frequency of the carrier signal from the standard frequency to a non-standard frequency at which the response signal from the OOFS active NFC device 104C and the IFS active NFC device 104B cannot be reliably received, but a which the response signals from the passive NFC device 104A can be reliably received without error.

Between times t0 and t4, the operation of the NFC reader 102 is the same as described in relation to FIG. 3A. With reference to graphs 302 and 304 of FIG. 3C corresponding to communication with the OOFS active NFC device 104C and with the IFS active NFC device 104B, after the NFC reader 102 has received an initial portion of the response signal between times t3 and t4, the NFC reader 102 switches the frequency of the carrier signal to a non-standard frequency. The NFC reader 102 then listens to or receives the remainder of the response signal between times t4 and t5. As can be seen in FIG. 3C, the remainder of the response signal between times t4 and t5 is distorted for the OOFS active NFC device 104C and the IFS active NFC device 104B. The result is a communication error in which the NFC reader 102 does not properly receive the remainder of the response from the OOFS active NFC device 104C and the IFS active NFC device 104B.

With reference to graph 306 of FIG. 3B, between times t4 and t5 the remainder of the response of the passive device 104A is received without error. By the procedure associated with FIG. 3B, the NFC reader 102 can determine whether or not an NFC device is an OOFS active NFC device.

In one example, the non-standard frequency of FIG. 3C is between 500 kHz and 900 kHz away from the standard frequency. The non-standard frequency may be higher or lower than the standard frequency. If the standard frequency is 13.56 MHz, then the non-standard frequency may be between 14.06 MHz and 14.46 MHz, or between 12.66 MHz and 13.06 MHz. The non-standard frequency of FIG. 3C can have other values than these without departing from the scope of the present disclosure. In one embodiment, the non-standard frequencies can have a range between 5 MHz and 25 MHz.

Figure 4:
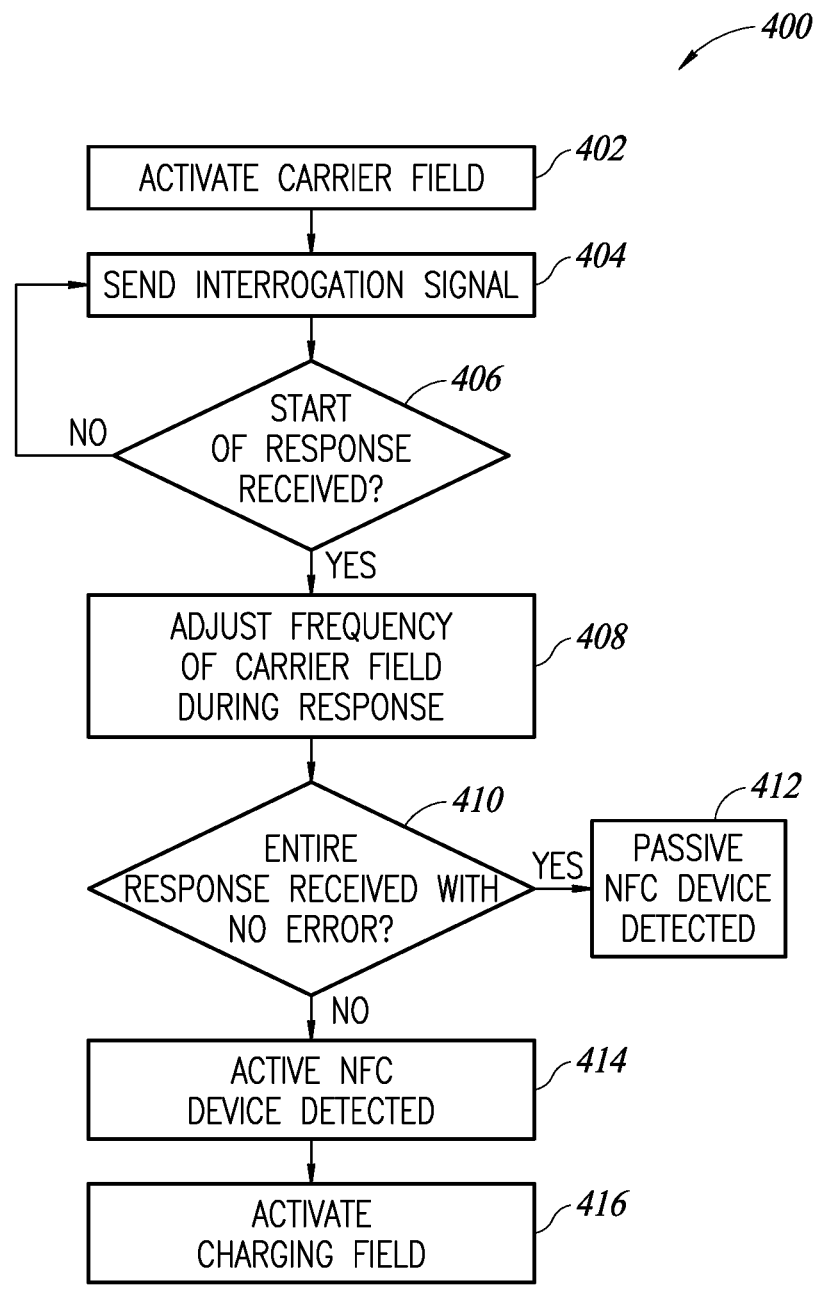
FIG. 4 is a flow diagram of a process for operating an NFC system, according to one embodiment.

FIG. 4 is a flow diagram of a method 400 for operating an NFC reader, according to one embodiment. The method 400 can utilize the systems, components, and processes described in relation to FIGS. 1-3C. With reference to FIG. 4 and FIGS. 1-3C, At 402, the NFC reader 102 activates the carrier field. In one example, this can correspond to times t0-t1 in FIG. 3C.

At 404, the NFC reader 102 sends the interrogation signal. Sending or transmitting the interrogation signal corresponds to modulating the carrier signal with the NFC reader 102. In one example, this can correspond to times t1-t2 of FIG. 3C.

At 406, the NFC reader 102 receives the start of a response signal from an NFC device 104. The response signal can be an identification signal that identifies the NFC device 104. In one example, the initial portion of the response signal can correspond to times t2-t3 in FIG. 3B. If the start of the response signal is received at 406, the process proceeds to 408. If the start of the response signal was not received at 406, the process returns to 404.

At 408, the NFC reader 102 adjusts the frequency of the carrier signal while receiving the response signal. Adjusting the frequency can correspond to changing from a standard NFC frequency to a non-standard NFC frequency. In FIG. 4, the non-standard NFC frequency is selected so that passive NFC devices can still provide an error-free response but active NFC devices will not be able to provide an error-free response. The period during which the non-standard frequency is used can correspond to times t4-t5 in FIG. 3B.

At 410, the NFC reader 102 determines whether the entire response signal was received with the error. In particular, the NFC reader 102 determines whether the remainder of the response signal was received without error. If there is no error in receiving the remainder of the response signal, then the process proceeds to 412. If there was an error in receiving the remainder of the response, then the process proceeds to 414. At 412, the NFC reader 102 determines that the NFC device 104 is a passive NFC device. At 414, the NFC reader determines that the NFC device 104 is an active NFC device.

In one embodiment, if an active NFC devices detected and no passive NFC devices are detected, then the NFC reader 102 activates a charging field. The charging field can be utilized by active NFC devices to recharge the batteries of the active NFC devices.

Figure 5:
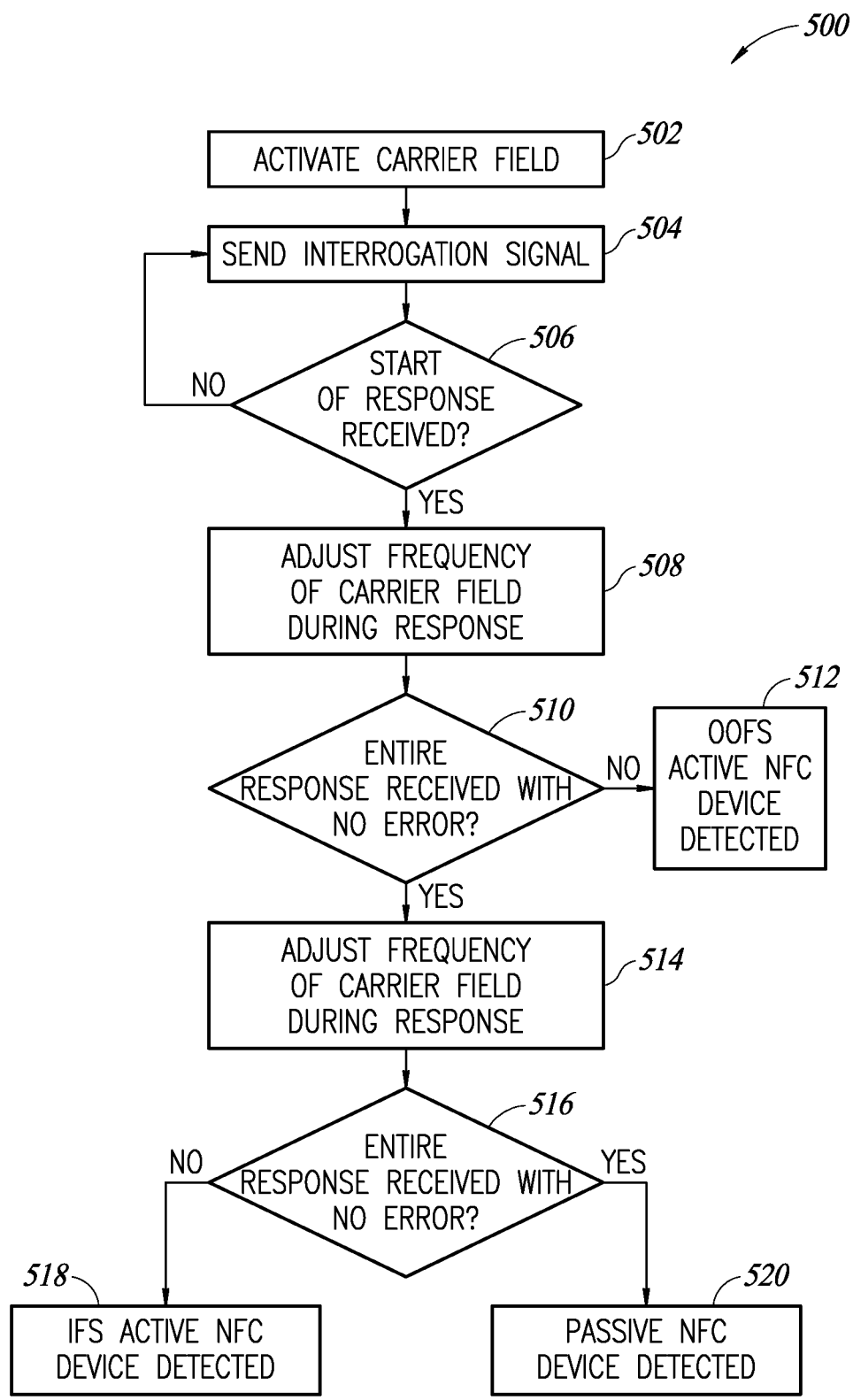
FIG. 5 is a flow diagram of a process for operating an NFC system, according to one embodiment.

FIG. 5 is a flow diagram of a process 500 for operating an NFC reader, according to one embodiment. The method 500 can utilize the systems, components, and processes described in relation to FIGS. 1-3C. With reference to FIG. 5 and FIGS. 1-3C, at 502, the NFC reader 102 activates the carrier field.

At 504, the NFC reader 102 sends the interrogation signal. Sending or transmitting the interrogation signal corresponds to modulating the carrier signal with the NFC reader 102. At 506, the NFC reader 102 receives the start of a response signal from an NFC device 104. The response signal can be an identification signal that identifies the NFC device 104. If the start of the response signal is received at 506, the process proceeds to 508. If the start of the response signal was not received at 506, the process returns to 404.

At 508, the NFC reader 102 adjusts the frequency of the carrier signal while receiving the response signal. Adjusting the frequency can correspond to changing from a standard NFC frequency to a first non-standard NFC frequency. In FIG. 5, the first non-standard NFC frequency is selected so that IFS active NFC devices and passive NFC devices can still provide an error-free response but OOFS active NFS devices will not be able to provide an error-free response.

At 510, the NFC reader 102 determines whether the entire response signal was received with the error. If there was an error in receiving the remainder of the response, then the process proceeds to 512. If there is no error in receiving the remainder of the response signal, then the process proceeds to 514. At 512, the NFC reader 102 determines that the NFC device 104 is an OOFS active NFC device.

At 514, the NFC reader 102 adjusts the frequency of the carrier signal while receiving the response signal. Adjusting the frequency can correspond to changing from a standard NFC frequency to a second non-standard NFC frequency. In FIG. 5, the second non-standard NFC frequency is selected so that passive NFC devices can still provide an error-free response but IFS active NFC devices will not be able to provide an error-free response. In practice, steps 504-510 happen in a first frame. Step 514 happens in a second frame after the first frame. Prior to step 514 the second frame may include repeating steps 502-506 for the second frame.

At 516, the NFC reader 102 detects whether the entire response signal was received with the error. In particular, the NFC reader 102 determines whether the remainder of the response signal was received without error in the second frame. If there was an error in receiving the remainder of the response, then the process proceeds to 518. If there is no error in receiving the remainder of the response signal and the second frame, then the process proceeds to 520. At 520, the NFC reader 102 determines that the NFC device 104 is a passive NFC device. At 518, the NFC reader determines that the NFC device 104 is an IFS active NFC device.

At steps 512 or 518, if no passive NFC devices are detected, then the NFC reader 102 can activate a charging field to charge either the OOFS active NFC device 104C or the IFS active NFC device 104B.

Figure 6:
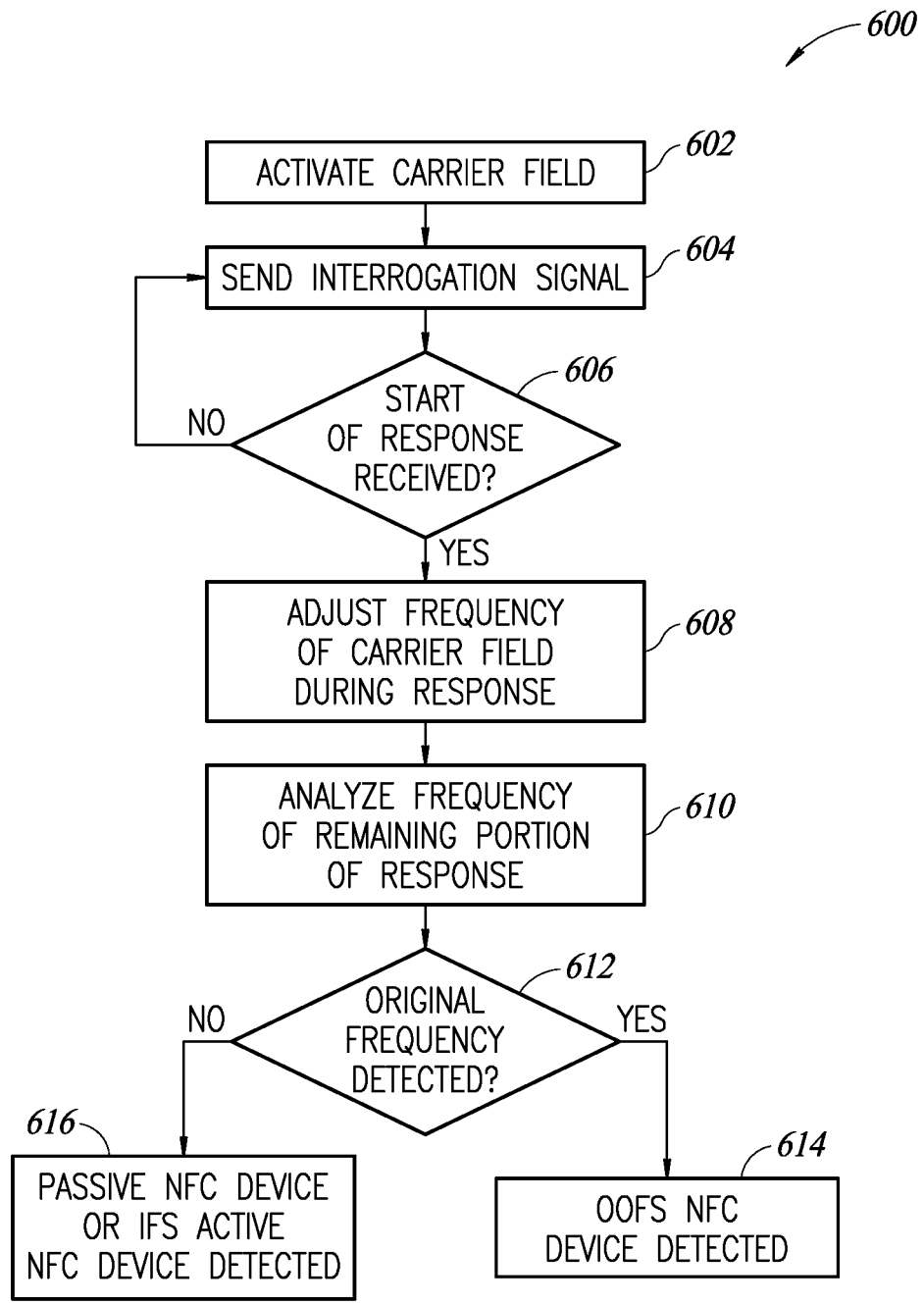
FIG. 6 is a flow diagram of a process for operating an NFC system, according to one embodiment.

FIG. 6 is a flow diagram of a method 600 for operating an NFC reader, according to one embodiment. The method 600 can utilize the systems, components, and processes described in relation to FIGS. 1-3C. With reference to FIG. 6 and Figures I-3C, At 602, the NFC reader 102 activates the carrier field.

At 604, the NFC reader 102 sends the interrogation signal. Sending or transmitting the interrogation signal corresponds to modulating the carrier signal with the NFC reader 102.

At 606, the NFC reader 102 receives the start of a response signal from an NFC device 104. The response signal can be an identification signal that identifies the NFC device 104. In one example, the initial portion of the response signal can correspond to times t2-t3 in FIG. 3B. If the start of the response signal is received at 606, the process proceeds to 608. If the start of the response signal is not received at 606, the process returns to 604.

At 608, the NFC reader 102 adjusts the frequency of the carrier signal while receiving the response signal. Adjusting the frequency can correspond to changing from a standard NFC frequency to a non-standard NFC frequency.

At 610, the NFC reader 102 analyzes the frequency distribution of the remaining portion of the response signal. This can include detecting the intensity of various frequencies in the response signal.

At 612, the NFC reader 102 identifies whether the original standard NFC frequency was defective in the remaining portion of the response signal. If the standard NFC frequency is a strong component of the remaining portion of the signal, then the process proceeds to 614. If the standard NFC frequency is not a strong component of the remaining portion of the signal, then the process proceeds to 616.

At 614, the NFC reader 102 determines that the NFC device is an OOFS active NFC device. At 616, the NFC reader 102 determines that the NFC device is either an IFS active NFC device or a passive NFC device. At step 616, further steps or processes can be performed to distinguish between an IFS NFC device and a passive NFC device. These can include identifying various other vacancy components of the response signal. Alternatively, the steps of the process 400 of FIG. 4 can be performed.

Figure 7:
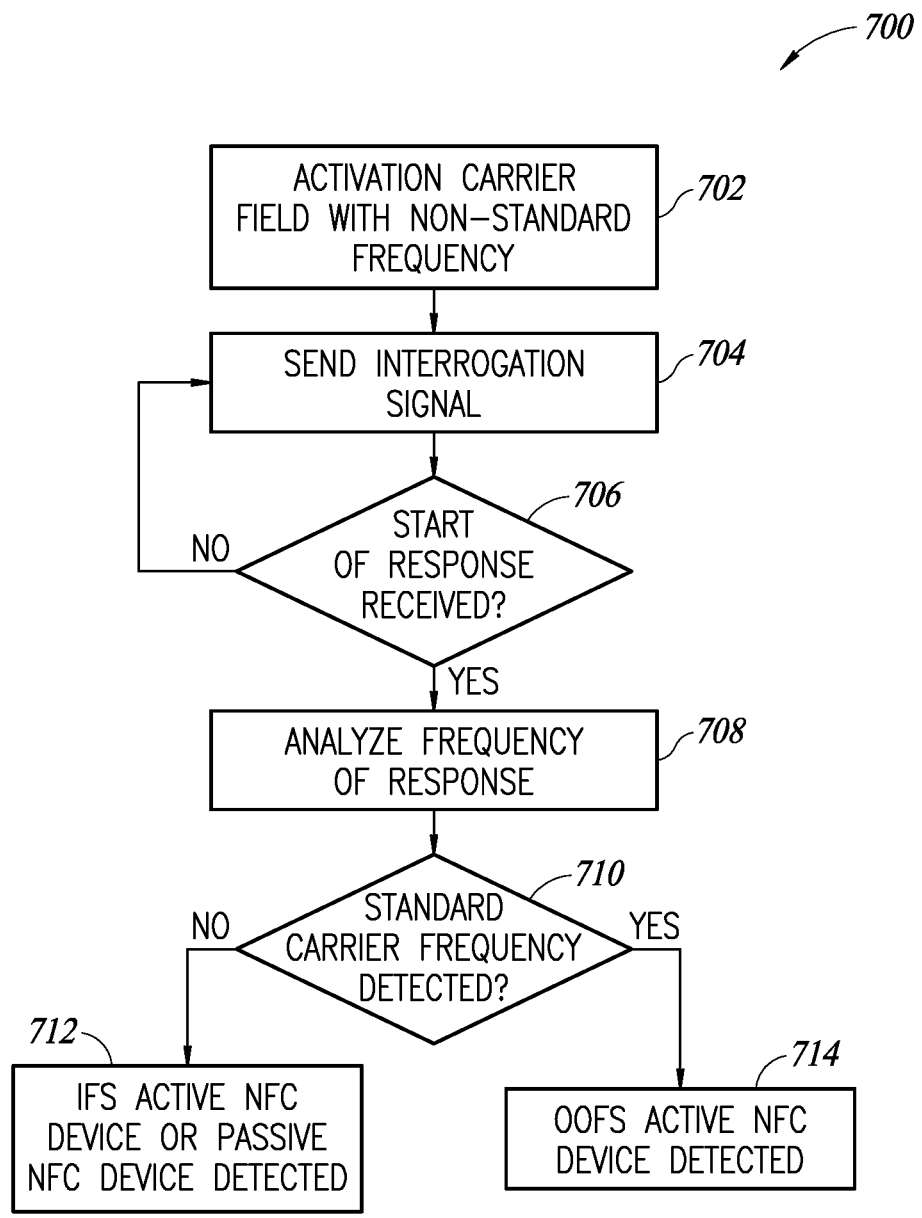
FIG. 7 is a flow diagram of a process for operating an NFC system, according to one embodiment.

FIG. 7 is a flow diagram of a method 700 for operating an NFC reader, according to one embodiment. The method 700 can utilize the systems, components, and processes described in relation to FIGS. 1-3C. With reference to FIG. 7 and Figures I-3C, at 702, the NFC reader 102 activates the carrier field with a non-standard frequency.

At 704, the NFC reader 102 sends the interrogation signal. Sending or transmitting the interrogation signal corresponds to modulating the carrier signal with the NFC reader 102.

At 706, the NFC reader 102 receives the start of a response signal from an NFC device 104. The response signal can be an identification signal that identifies the NFC device 104. If the start of the response signal is received at 706, the process proceeds to 708. If the start of the response signal was not received at 706, the process returns to 704.

At 708, the NFC reader 102 analyzes the frequency distribution of the remaining portion of the response signal. This can include detecting the intensity of various frequencies in the response signal.

At 710, the NFC reader 102 identifies whether the original standard NFC frequency was detected in the remaining portion of the response signal. If the standard NFC frequency is not a strong component of the remaining portion of the signal, then the process proceeds to 712. If the standard NFC frequency is a strong component of the remaining portion of the signal, then the process proceeds to 714.

At 714, the NFC reader 102 determines that the NFC device is an OOFS active NFC device. At 712, the NFC reader 102 determines that the NFC device is either an IFS active NFC device or a passive NFC device. At step 712, further steps or processes can be performed to distinguish between an IFS active NFC device and a passive NFC device. These can include identifying various other frequency components of the response signal. Alternatively, the steps of the process 400 of FIG. 4 can be performed.

Figure 8:
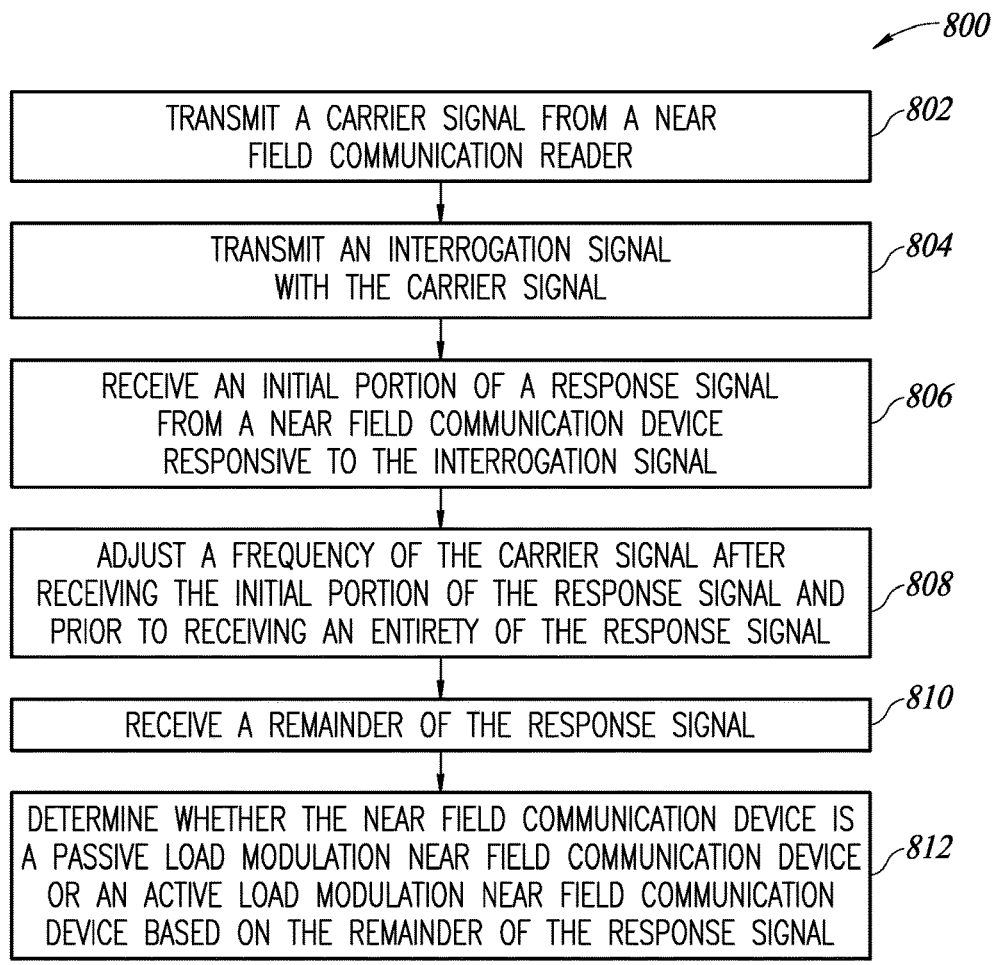
FIG. 8 is a flow diagram of a process for operating an NFC system, according to one embodiment.

FIG. 8 is a flow diagram of a method 800 for operating an NFC reader, according to one embodiment. At 802, the method 800 includes transmitting a carrier signal from a near field communication reader. At 804, the method 800 includes transmitting an interrogation signal with the carrier signal. At 806, the method 800 includes receiving a portion of a response signal from a near field communication device responsive to the interrogation signal. At 808, the method 800 includes adjusting a frequency of the carrier signal for a selected duration after receiving the portion of the response signal and prior to receiving an entirety of the response signal. At 810, the method 800 includes receiving a remainder of the response signal. At 812, the method 800 includes determining whether the near field communication device is a passive near field communication device or an active load modulation near field communication device based on the remainder of the response signal.

Figure 9:
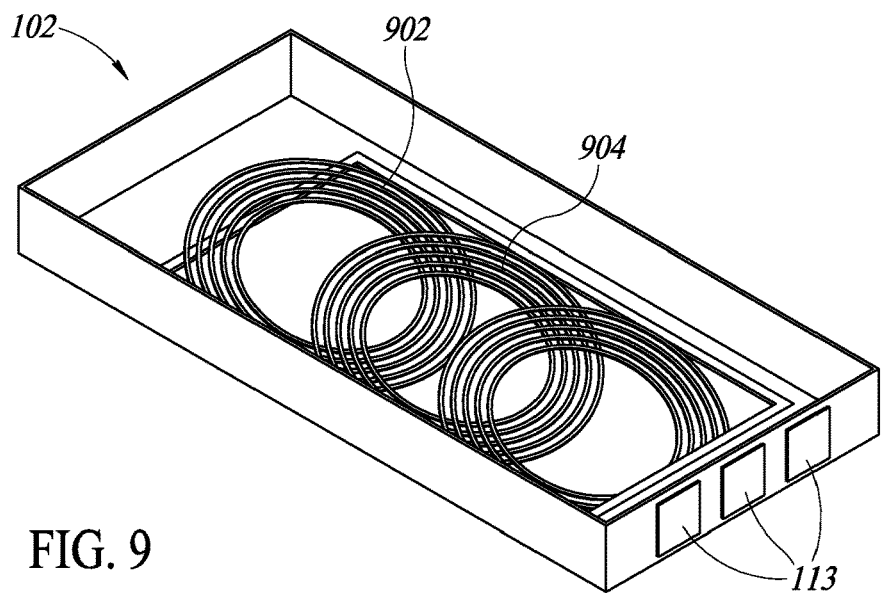
FIG. 9 is an illustration of an NFC reader, according to one embodiment.

FIG. 9 is an illustration of circuitry of an NFC reader 102, according to one embodiment. The NFC reader 102 includes an NFC antenna coil 902, a wireless charging antenna coil 904, and a reader control system 113. The NFC antenna coil 902 is part of an RF transceiver 111 by which the NFC reader 102 implements NFC communication with NFC devices. The wireless charging coil 904 is part of wireless charging circuitry 112 by which the NFC reader 102, or an electronic device of which the NFC reader 102 is part, provides a wireless charging field. The reader control system 113 controls the RF antenna coil and the wireless charging coil, in one embodiment. Parts of the wireless charging circuitry 112 may be included in the reader control system 113. The wireless charging circuitry 112 may, alternatively, be controlled by a separate control system. In one embodiment, the wireless charging antenna coil 904 is a Qi standard wireless charging coil. However, the charging antenna coil 904 can utilize charging standards other than Qi without departing from the scope of the present disclosure. Additionally, there may be different numbers and configurations of antenna coils than shown in FIG. 9 without departing from the scope of the present disclosure.

Figure 10:
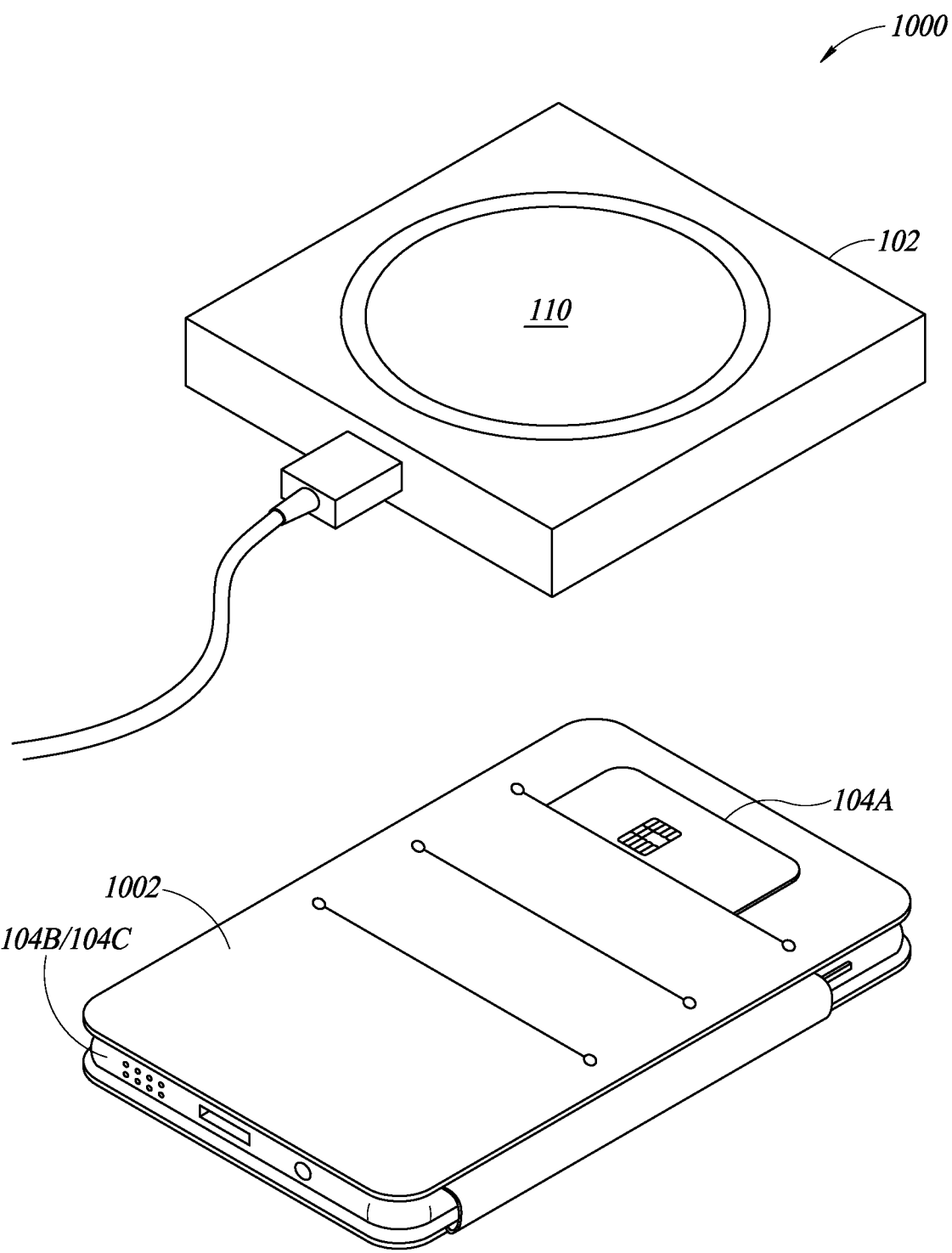
FIG. 10 is an illustration of an NFC system, according to one embodiment.

FIG. 10 is an illustration of an NFC communication system 1000, according to one embodiment. The NFC communication system 1000 includes an NFC reader 102, a passive NFC device 104A and active NFC device 104B (IFS) or 104C (OOFS). The NFC reader 102 communicates with the active NFC device 104B/104C and the passive NFC device 104A.

In the example of FIG. 10, the active NFC device 104B/104C is a smart phone with active NFC circuitry. In the example of FIG. 10, the passive NFC device 104A is a credit card with passive NFC circuitry. The smart phone includes a protective case 1002. The protective case 1002 includes several slots for holding cards of various types. The credit card is positioned in one of the slots of the protective case 1002. This is a common configuration that enables people to carry their identification and credit cards with their smart phone.

The NFC reader 102 includes a charging bay 110. A user can place the smart phone 104B/104C on the charging bay. The NFC reader 102 can communicate with the smart phone 104 via NFC protocols. The NFC reader 102 can charge the battery of the smart phone when the smart phone is positioned on the charging bay 110.

Because the credit card 104A is a passive NFC device including passive NFC circuitry, it is possible that a fully powered charging field could damage the NFC circuitry of the credit card 104A. Thus, when the credit card 104A is positioned in the protective case 1002 of the smart phone 104B/104C and the smart phone 104B/104C is positioned on the charging bay 110, it is possible that a fully powered charging field could damage the NFC circuitry of the credit card 104A.

When the smart phone 104B/104C is positioned on the charging bay 110, the NFC reader 102 outputs interrogation signals and listens for responses on the various NFC protocols. In this way, the NFC reader 102 establishes communication with both the smart phone 104B/104C and the credit card 104A.

After identifying both the smart phone 104B/104C and the credit card 104A, the NFC reader 102 performs a process for conclusively determining the NFC type of both the smart phone 104B/104C and the credit card 104A. In particular, the NFC reader 102 transmits an interrogation signal with the protocol of the smart phone 104B/104C. When the NFC reader 102 receives the start of the identification or response signal from the smart phone 104B/104C, the NFC reader 102 adjusts frequency of the carrier signal. During the adjustment of the frequency of the carrier signal, the NFC reader 102 listens for the identification signal. In one example, the NFC reader 102 detects the presence of both the credit card 104A and the smart phone 104B/104C. Because the NFC reader one has detected that there is both a passive NFC device and an active NFC device present, the wireless charging circuitry 112 outputs a charging field with a reduced amplitude or power. The power of the charging field is selected to not damage the NFC circuitry of the credit card 104A. The charging field charges the battery of the smart phone 104B/104C.

If the NFC reader 102 detects an active NFC device only, the wireless charging circuitry 112 can output a full powered charging field to charge the battery of the active NFC device. If the NFC reader one detects only a passive NFC device, the wireless charging circuitry 112 will not output any charging field.

FIG. 10 illustrates an embodiment in which an active NFC device is a smart phone and a passive NFC device is an NFC enabled credit card. However, other types of active and passive NFC devices can be utilized without departing from the scope of the present disclosure.

In one embodiment, a method include transmitting a carrier signal from a near field communication reader, transmitting an interrogation signal with the carrier signal, and receiving an initial portion of a response signal from a near field communication device responsive to the interrogation signal. The method includes adjusting a frequency of the carrier signal after receiving the initial portion of the response signal and prior to receiving an entirety of the response signal, receiving a remainder of the response signal, and determining whether the near field communication device is a passive load modulation near field communication device or an active load modulation near field communication device based on the remainder of the response signal.

In one embodiment, a method includes transmitting a carrier signal from a near field communication reader, transmitting an interrogation signal with the carrier signal, and receiving an initial portion of a response signal from a near field communication device responsive to the interrogation signal. The method includes adjusting a frequency of the carrier signal after receiving the initial portion of the response signal and prior to receiving an entirety of the response signal, receiving a remainder of the response signal, and determining whether the near field communication device is a first type of active load modulation near field communication device or a second type of active load modulation device based on the remainder of the response signal.

In one embodiment, a method includes transmitting a first interrogation signal with a carrier signal from a near field communication reader during a first near field communication frame, adjusting, during the first near field communication frame, a frequency of the carrier signal from a first frequency to a second frequency, and receiving, during the first near field communication frame, a first response signal from a near field communication device. The method includes transmitting, during a second near field communication frame after the first near field communication frame, a second interrogation signal with the carrier signal, adjusting, during the second near field communication frame, the frequency of the carrier signal from the first frequency to a third frequency, receiving, with the near field communication reader during the second near field communication frame, a second response signal from a near field communication device, and determining whether the near field communication device is an in-frame synchronization active load modulation near field communication device, an out-of-frame synchronization active load modulation near field communication device, or a passive load modulation near field communication device based on the first response signal and the second response signal.

In one embodiment, a method includes transmitting a carrier signal from a near field communication reader and adjusting a frequency of the carrier signal during a near field communication frame. The method includes receiving, with the near field communication reader during the near field communication frame, a response signal from a near field communication device and determining whether a near field communication device is a passive load modulation near field communication device or an active load modulation near field communication device based on the response signal.

In one embodiment, a method includes transmitting a carrier signal from a near field communication reader, transmitting an interrogation signal with the carrier signal, and receiving an initial portion of a response signal from a near field communication device responsive to the interrogation signal. The method includes adjusting, after receiving the initial portion of the response signal and prior to receiving an entirety of the response signal, a frequency of the carrier signal from a first frequency to a second frequency, receiving a remainder of the response signal, and identifying a type of the near field communication device by analyzing a frequency of the remainder of the response signal.

In one embodiment, a method includes transmitting, from a near field communication reader, a carrier signal with a non-standard frequency for near field communication and transmitting an interrogation signal with the carrier signal. The method includes receiving, from a near field communication device, a response signal and identifying a type of the near field communication device by analyzing a frequency of the response signal.

In one embodiment, a near field communication reader includes a radiofrequency transceiver configured to transmit and receive near field communication signals and a control system coupled to the radiofrequency transceiver. The control system is configured to cause the radiofrequency transceiver to output an interrogation signal, to output a carrier signal, and to adjust a frequency of the carrier signal responsive to receiving an initial portion of a response signal from a near field communication device.

In one embodiment, a near field communication reader includes a radiofrequency transceiver configured to transmit and receive near field communication signals and a control system coupled to the radiofrequency transceiver. The control system is configured to cause the radiofrequency transceiver to adjust a frequency of a carrier signal from a first frequency to a second frequency while receiving a first response signal from a near field communication device during a first frame, to adjust the frequency of the carrier signal from the first frequency to a third frequency while receiving a second response signal from the near field communication device during a second frame, and to determine whether the near field communication device is an in-frame synchronization active load modulation near field communication device, an out-of-frame synchronization active load modulation near field communication device, or a passive load modulation near field communication device based on the first response signal and the second response signal.

In one embodiment, a near field communication reader includes a radiofrequency transceiver configured to transmit and receive near field communication signals and a control system coupled to the radiofrequency transceiver. The control system is configured to cause the radiofrequency transceiver to transmit a carrier signal, to adjust a frequency of the carrier signal during from a first frequency to a second frequency during a near field communication frame, and to receive a response signal from a near field communication device during the near field communication frame. The control system is configured to determine whether a near field communication device is a passive load modulation near field communication device or an active load modulation near field communication device based on a frequency of the response signal.

In one embodiment a near field communication reader includes a radiofrequency transceiver configured to transmit and receive near field communication signals and a control system coupled to the radiofrequency transceiver. The control system is configured to cause the radiofrequency transceiver to transmit a carrier signal from a near field communication reader with a non-standard frequency for near field communication, to transmit an interrogation signal with the carrier signal, and to receive, from a near field communication device, a response signal, wherein the control system is configured to identify a type of the near field communication device by analyzing a frequency of the response signal.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A method comprising:
   transmitting a carrier signal from a near field communication reader;
   transmitting an interrogation signal with the carrier signal;
   receiving an initial portion of a response signal from a near field communication device responsive to the interrogation signal;
   adjusting a frequency of the carrier signal after receiving the initial portion of the response signal and prior to receiving an entirety of the response signal;
   receiving a remainder of the response signal; and
   determining whether the near field communication device is a passive load modulation near field communication device or an active load modulation near field communication device based on the remainder of the response signal.

2. The method of claim 1, wherein adjusting the frequency includes adjusting the frequency from a standard near field communication frequency to a non-standard near field communication frequency.

3. The method of claim 2, wherein the standard near field communication frequency is 13.56 MHz.

4. The method of claim 1, further comprising determining whether the near field communication device is a passive load modulation near field communication device or an active load modulation device based on whether the remainder of the response signal includes an error.

5. The method of claim 4, further comprising:
   if the remainder of the response signal includes an error, determining that the near field communication device is an active load modulation near field communication device; and
   if the remainder of the response signal does not include an error, determining that the near field communication device is an passive load modulation near field communication device.

6. The method of claim 5, further comprising outputting a charging signal from the near field communication reader if the near field communication device is an active load modulation near field communication device.

7. A method comprising:
   transmitting a carrier signal from a near field communication reader;
   transmitting an interrogation signal with the carrier signal;
   receiving an initial portion of a response signal from a near field communication device responsive to the interrogation signal;
   adjusting a frequency of the carrier signal after receiving the initial portion of the response signal and prior to receiving an entirety of the response signal;
   receiving a remainder of the response signal; and
   determining whether the near field communication device is a first type of active load modulation near field communication device or a second type of active load modulation device based on the remainder of the response signal.

8. The method of claim 7, wherein the first type of active load modulation device is an in-frame synchronization active load modulation near field communication device.

9. The method of claim 8, wherein the second type of active load modulation device is out-of-frame synchronization active load modulation near field communication device.

10. The method of claim 9, further comprising:
    determining if the remainder of the response signal includes an error;
    if the remainder of the response signal includes an error, determining that the near field communication device is an out-of-frame synchronization active load modulation near field communication device; and
    if the remainder of the response signal does not include an error, determining that the near field communication device is an in-frame synchronization active load modulation near field communication device.

11. A near field communication reader, comprising:
    a radiofrequency transceiver configured to transmit and receive near field communication signals; and
    a control system coupled to the radiofrequency transceiver and configured to cause the radiofrequency transceiver to output an interrogation signal, to output a carrier signal, and to adjust a frequency of the carrier signal responsive to receiving an initial portion of a response signal from a near field communication device.

12. The near field communication reader of claim 11, wherein the radiofrequency transceiver is configured to receive a remainder of the response signal after adjusting the frequency, wherein the control system is configured to determine whether the near field communication device is an active near field communication device or a passive near field communication device based on the remainder of the response signal.

13. The near field communication reader of claim 12, further comprising a memory including software instructions for determining whether the near field communication device is an active near field communication device or a passive near field communication device.

14. The near field communication reader of claim 13, wherein the control system includes one or more processors communicatively coupled to the memory and configured to execute the software instructions.

15. The near field communication reader of claim 12, further comprising wireless charging circuitry separate from the radiofrequency transceiver, wherein the control system is configured cause the wireless charging circuitry to output a charging field for recharging a battery of the near field communication device if the near field communication device is an active near field communication device.

16. The near field communication reader of claim 15, wherein the control system is configured cause the wireless charging circuitry to output a reduced charging field for recharging a battery of the near field communication device if a passive near field communication device is also present.

17. The near field communication reader of claim 15, wherein the wireless charging circuitry operates in accordance with a Qi standard for wireless charging.

18. The near field communication reader of claim 17, wherein the wireless charging field has a frequency between 87 KHz and 205 kHz, wherein the radiofrequency transceiver communicates between 5 MHz and 25 MHz.

19. The near field communication reader of claim 11, wherein the radiofrequency transceiver is configured to receive a remainder of the response signal after adjusting the frequency, wherein the control system is configured to determine whether the near field communication device is an in-frame synchronization active load modulation near field communication device or an out-of-frame active load modulation near field communication device based on the remainder of the response signal.

20. The near field communication device of claim 19, wherein the radiofrequency transceiver is configured to:
   determine if the remainder of the response signal includes an error;
   if the remainder of the response signal includes an error, determine that the near field communication device is an out-of-frame synchronization active load modulation near field communication device; and
   if the remainder of the response signal does not include an error, determine that the near field communication device is an in-frame synchronization active load modulation near field communication device.

* * * * *